United States Patent [19]

Spycher et al.

[11] 4,311,762
[45] Jan. 19, 1982

[54] PLASTIC COMPONENTS OF IMPROVED HARDNESS AND SCRATCH RESISTANCE

[75] Inventors: Anton A. Spycher, Big Flats, N.Y.; Dennis J. Damico, Erie, Pa.

[73] Assignee: Corning Glass Works, Corning, N.Y.

[21] Appl. No.: 200,533

[22] Filed: Oct. 24, 1980

[51] Int. Cl.³ .................... B32B 17/10; B32B 27/36; G02C 7/10

[52] U.S. Cl. .................... 428/412; 351/163; 351/166; 428/423.1; 428/423.7; 428/425.5; 428/437; 528/228; 528/314

[58] Field of Search ............... 526/228, 314; 428/412, 428/437, 423.1, 423.7, 425.5, 524; 351/163, 166

[56] References Cited

U.S. PATENT DOCUMENTS

| Re. 25,763 | 4/1965 | Marcus | 526/228 |
|---|---|---|---|
| 2,464,062 | 3/1949 | Strain | 526/314 |
| 2,964,501 | 12/1960 | Sarofeen | 526/314 |
| 4,168,339 | 9/1979 | Kerko | 428/426 |
| 4,227,950 | 10/1980 | Spycher | 351/166 |
| 4,246,207 | 1/1981 | Spycher | 249/134 |
| 4,264,156 | 4/1981 | Spycher | 351/163 |
| 4,268,134 | 5/1981 | Gulati | 351/163 |

OTHER PUBLICATIONS

"Encyclo. Polymer Sci. & Tech.", vol. 1, 1964, pp. 799–803.

*Primary Examiner*—Ellis P. Robinson
*Attorney, Agent, or Firm*—Kees van der Sterre

[57] ABSTRACT

Low hardness and scratch resistance in direct-cast diethylene glycol bis(allyl carbonate) (CR-39®) plastic surface laminae in glass-plastic lenses are analyzed and new plastic formulations, preferably comprising the monomer catalyzed with a mixed isopropyl percarbonate-benzoyl peroxide polymerization catalyst, are disclosed, offering improved hardness and scratch resistance for laminated lenses and also for CR-39® plastic articles generally.

7 Claims, 3 Drawing Figures

PLASTIC COMPONENTS OF IMPROVED HARDNESS AND SCRATCH RESISTANCE

BACKGROUND OF THE INVENTION

The present invention relates to polycarbonate plastics useful for lenses or other articles and particularly to allyl carbonate ophthalmic lenses and lens components exhibiting improved hardness and scratch resistance.

The most widely used plastic for the production of plastic ophthalmic lenses is an allyl carbonate plastic, specifically diethylene glycol bis(allyl carbonate) plastic which is well known and commercially available in monomer form as CR-39 ® monomer. The hardness and scratch resistance of lenses made of polymerized CR-39 ® monomer depend on several factors, including the composition and concentration of the polymerization catalyst used, and the thermal treatment employed in polymerizing the resin to obtain the solid product. The polymerization catalyst most commonly employed by CR-39 ® lens manufacturers is isopropyl percarbonate, typically at a concentration of about 3% by weight in the resin-catalyst mixture to be hardened.

Commercial lens manufacturers frequently utilize hardness testing to control the quality of their product, since hardness testing is simpler than most scratch testing procedures and correlates well with scratch resistance in cured CR-39 ® plastic lenses. The hardness values exhibited by commercially available lenses, as measured by a standard Barber-Colman impresser device (Barcol GYZJ 935 hprocedures and correlates well with scratch resistance in cured CR-39 ® plastic lenses. The hardness values exhibited by commercially available lenses, as measured by a standard Barber-Colman impresser device (Barcol GYZJ 935 hardness tester), will typically range from about 77–80.

It has recently been proposed to use allyl carbonate resins to produce lightweight glass-plastic laminated lenses by the direct casting of these resins against adhesive-coated glass sheet. As disclosed in a copending, commonly assigned application by S. T. Gulati et al., Ser. No. 18,107 filed Mar. 7, 1979, now U.S. Pat. No. 4,268,134 a typical design for such a lens incorporates a thin glass core element composed of photochromic (reversibly darkenable) glass microsheet positioned between two opposing plastic surface elements. The plastic surface elements are formed by the direct casting of CR-39 ® plastic resin against the glass, with the glass being first coated with a polymeric bonding adhesive providing a bonding layer between the glass and plastic after curing.

In grinding the surfaces of such direct-cast laminated lenses to selected prescriptions for ophthalmic use, it was recently discovered that the hardness of the plastic surface elements, although apparently adequate as measured at the surfaces of the lenses as made, was well below commercially acceptable levels in a boundary region of the plastic layers adjacent to the adhesive bonding layers in the laminates. For example, at plastic layer thicknesses of 1 mm or less, Barcol hardness values of 71 and below were frequently observed. Since it was anticipated that prescription grinding would frequently involve the removal of sufficient material from the outer plastic elements to approach this thickness, thus exposing the softer plastic of the boundary region, a solution to the problem of low hardness adjacent the boundary region was sought.

SUMMARY OF THE INVENTION

The present invention is founded on the discovery that the softening of direct-cast diethylene glycol bis(allyl carbonate) plastic lens elements which occurs adjacent adhesive bonding layers is due to catalyst absorption by the adhesive during or prior to plastic polymerization. Based on this discovery, the invention provides a method for enhancing the hardness and scratch resistance of the boundary layer, as well as a method for enhancing the hardness and scratch resistance of polymerized CR-39 ® plastic formulations generally, by modifying the composition and/or amount of the plastic polymerization catalysts used in the plastic formulation to be polymerized.

In one aspect, then, the invention includes a method for providing a polymerized diethylene glycol bis(allyl carbonate) plastic article or element exhibiting enhanced scratch resistance and hardness which comprises polymerizing the plastic monomer by means of a mixed polymerization catalyst. This catalyst consists essentially of a mixture of isopropyl percarbonate and benzoyl peroxide. We have found this catalyst combination to be unique in its effect on the hardness and scratch resistance of CR-39 ® based plastic lens elements, whether in the form of an element of a glass-plastic laminated lens such as above described or as another lens element, lens or article composed of CR-39 ® plastic.

Specifically applying the aforementioned discovery to laminated lenses, it has been found possible by controlling catalyst concentration and/or composition to obtain substantial improvements in Barcol hardness in the aforementioned boundary regions of glass-plastic laminated articles incorporating direct-cast CR-39 ® plastic surface layers. Hence the invention further provides a glass-plastic laminated article, such as a lens, comprising at least one direct-cast diethylene glycol bis(allyl carbonate) plastic surface element bonded to a glass element by a polymeric bonding layer, wherein the cast plastic surface element exhibits a Barcol hardness at least equivalent to the minimum hardness of conventional lenses (a Barcol hardness of at least about 77) in regions of the element spaced 1 mm or greater from the polymeric bonding layer in the lens. This can be achieved by increasing isopropyl percarbonate concentration alone; however, in a preferred embodiment utilizing the isopropyl percarbonate-benzoyl peroxide catalyst combination above described, laminated lenses exhibiting scratch resistance and surface hardness equivalent to or greater than the best values exhibited by conventional CR-39 ® lenses may be obtained.

BRIEF DESCRIPTION OF THE DRAWINGS

The invention may be further understood by reference to the drawing wherein.

DETAILED DESCRIPTION

Figure 1:
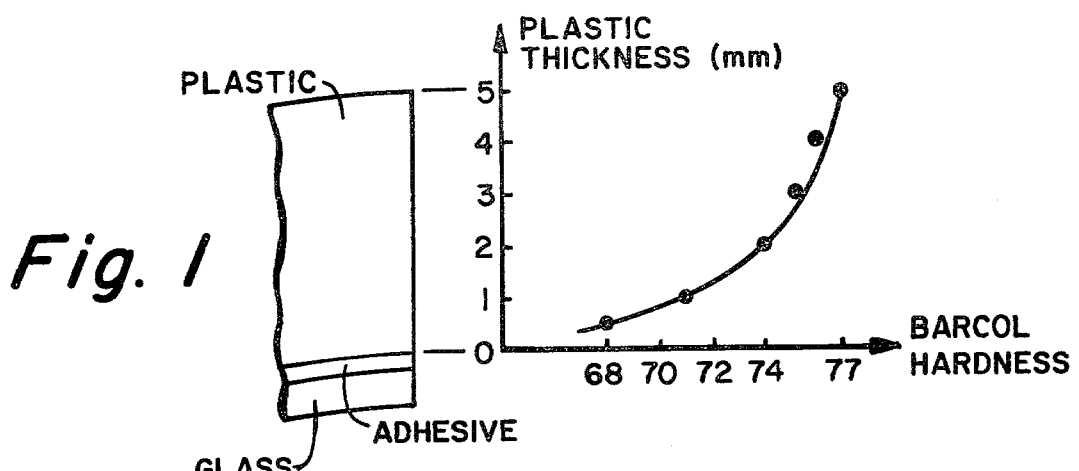
FIG. 1 schematically shows a glass-plastic laminate incorporating a conventional CR-39 ® plastic surface layer in conjunction with a graph plotting Barcol hardness as a function of spacing from the adhesive layer in the laminate.

The problem underlying the present invention can be more fully understood by reference to FIG. 1 of the drawing which schematically shows a glass-plastic laminate comprising a thin glass layer, an adhesive bonding layer, and a direct-cast CR-39 ® plastic surface layer about 5 mm in thickness. The graph adjacent the drawing of the laminate plots Barcol hardness in the plastic layer as a function of distance from the adhesive bonding layer and suggests that, while hardness values near the outer surface of the plastic layer are at conventional levels, considerably lower hardness in the plastic is observed in regions close to the bonding layer. Hardness values of 71 and below are shown at distances 1 mm and less from the adhesive.

Overcoming this problem through the control of catalyst composition and/or concentration in accordance with the invention requires no new or unusual coating or curing techniques. As noted in the aforementioned Gulati et al. application, expressly incorporated herein by reference for a more complete description of a preferred laminated product and method, a thin sheet of glass, typically having a thickness not exceeding about 20 mils, is first coated on both sides with a polymeric adhesive to provide an adhesive bonding layer. The glass may be, for example, photochromic microsheet glass such as described in U.S. Pat. No. 4,168,339 to Kerko et al.

The polymeric adhesive used to coat the glass will depend on the size and configuration of the article, and its intended use. For ophthalmic lens applications, the use of low elastic modulus adhesive polymers, exemplified by selected polyurethane and highly plasticized polyvinyl butyral polymers, is preferred. Uniform coatings of such polymers can be applied by dipping sheet glass elements to be provided with coatings into solutions of the adhesives in organic solvents.

In prior practice, CR-39 ® plastic surface layers for glass-plastic lens blanks were formed by the direct casting of conventional CR-39 ® resin/catalyst mixtures against both sides of the adhesive-coated glass, followed by thermal curing of the resin in situ. The resin formulations employed, as conventional in commercial allyl diglycol carbonate lens fabrication procedures, were prepolymerized resin/catalyst mixtures comprising about 3% by weight of isopropyl percarbonate as the catalyst. The prepolymerized state, attained by moderate heating (40° C.) of the catalyst/resin monomer mixture for about 2 hours or until a viscosity of about 230 cps was attained, helps to guard against resin/catalyst separation and thus insures uniform polymerization during the subsequent lens component curing step. This formulation provides a cured laminated component exhibiting the hardness characteristics shown in FIG. 1 of the drawing.

Similar procedures are followed when utilizing a two-part catalyst in accordance with the invention, but with some variation in the prepolymerization step. Of course, prepolymerization can be omitted if the catalyst/monomer mixture is to be immediately used. However, in case storage is required, the preferred procedure is to divide the CR-39 ® monomer into two portions, and to add one of the catalysts components to each portion for separate prepolymerization. The separately prepolymerized portions may then be cooled, mixed, and stored with stirring in conventional fashion.

Catalyst mixtures which can be used to improve CR-39 ® plastic hardness in accordance with the invention can include, as computed on the basis of the total weight of the catalyst/monomer or resin mixture, 0.5–6% of benzoyl peroxide, 1–9% of isopropyl percarbonate, 3.5–13% total of isopropyl percarbonate plus benzoyl peroxide, and the remainder diethylene glycol bis(allyl carbonate), by weight. The mechanism by which these catalyst combinations are effective to enhance the hardness and scratch resistance of CR-39 ® resin formulations is not fully understood, but it is known that strong polymerization by isopropyl percarbonate occurs at about 45° C. while benzoyl peroxide triggers polymerization at about 70° C. It is thus theorized that perhaps a second stage polymerization, initiated by benzoyl peroxide at the higher temperature following initial polymerization by isopropyl percarbonate at the lower temperature, could impart enhanced hardness and/or scratch resistance to the cured resin.

In prepolymerizing CR-39 ® monomer batches containing isopropyl percarbonate or benzoyl peroxide at concentrations of more than about 3% of either, overheating can promote a rapid exothermic reaction in the batch which detrimentally affects the properties of the resulting plastic. The normal prepolymerization treatment for a 3% benzoyl peroxide-catalyzed mixture (1 hour at 80° C.) should accordingly be modified by reducing the temperature in direct proportion to the amount of catalyst added in excess of 3%. Temperature reduction should be such that, at a benzoyl peroxide concentration of 6%, a prepolymerization temperature of only 25° C. is used. Likewise, the standard prepolymerization temperature of 40° C. for a 3% isopropyl percarbonate-catalyzed mixture should be reduced, again in proportion to increases in catalyst concentration, such that at a concentration of 6% or greater of this catalyst a prepolymerization temperature of 25° C. is used.

In general, no changes in the duration of the prepolymerization treatments are required with either catalyst, provided that reduced temperatures are used when high catalyst concentrations are employed. The prepolymerized CR-39 ® resin batches can be mixed after treatment and then stored at reduced temperatures (e.g., −10° C.) in accordance with conventional storage practice.

It is important in achieving the preferred combinations of hardness and scratch resistance in accordance with the invention that a combination of isopropyl percarbonate and benzoyl peroxide catalysts be used. A study concerning the effects of increased concentrations of isopropyl percarbonate on the properties of cured plastics indicated that while increases in boundary layer hardness sufficient to meet minimum commercial requirements were attainable (e.g. Barcol hardness values of 77 in one millimeter thickness at a catalyst concentration of 3.5–4%), further increases actually resulted in reductions in boundary layer hardness. It was found that somewhat higher hardnesses could be obtained with benzoyl peroxide alone, but with some yellowing of the plastic at the concentrations required and without the scratch resistance of conventional commercial products.

The scratch resistance of CR-39 ® plastic products can be evaluated on two different scales, referred to as heavy scratch resistance and light scratch resistance.

Heavy scratch resistance is measured by a diamond scribing device such as a Taber scratch tester (e.g., the Taber Model #502 Scratch Tester, commercially available from Teledyne Taber, North Tonawanda, N.Y.). Heavy scratch resistance is reported in grams, referring to the weight which must be applied to the diamond scribe to produce permanent scratching by breakthrough of the plastic surface, with conventional CR-39 ® plastic products typically exhibiting scratch resistance up to about 750 grams of scribe weight.

Light scratch resistance is measured with the same apparatus utilizing a 500 gram weight which is normally insufficient to cause uniform surface breakthrough but which can cause plastic deformation or erratic surface breakthrough. Light scratch resistance is reported on an arbitrary scale as follows:

| Light Scratch Test Result | Reported Value |
| --- | --- |
| No marking | 0 |
| Plastic deformation only | 1-2 |
| Erratic surface breakthrough | 3-4 |
| Uniform surface breakthrough | 5 |

CR-39 ® plastic articles produced in accordance with conventional techniques typically exhibit light scratch resistance values averaging about 2.5.

Table I below reports hardness and scratch resistance data for a number of different CR-39 ® resin/catalyst combinations polymerized in conventional lens configurations or laminated lens components attached to glass via polymeric bonding layers. Included in the Table are identifications of the lens configurations tested, whether laminated or conventional, an indication of the catalysts used and the concentrations thereof employed, whether isopropyl percarbonate (IPP) or benzoyl peroxide (BP), and the hardness and scratch resistance of the resulting products. All data for laminated products was taken on laminates incorporating CR-39 ® plastic surface layers of 1 mm thickness over 5-mil polyurethane bonding layers on glass.

TABLE I

| Lens Configuration | Polymerization Catalyst | Barcol Hardness | Heavy Scratch Resistance (gm) | Light Scratch Resistance (0-5 Scale) |
| --- | --- | --- | --- | --- |
| Conventional | 3% IPP | 77 | 750 | 2.5 |
| Laminated | 3% IPP | 70 | 700 | 4 |
| Laminated | 3.5-4% IPP | 77 | 750 | 3.5 |
| Laminated | 7% IPP | 76 | 800 | 1 |
| Laminated | 6% BP | 81 | 700 | 2 |
| Laminated | 6% IPP + 1% BP | 80 | 850 | 2 |
| Laminated | 5% IPP + 3.5% BP | 80 | 1000 | 0 |
| Laminated | 1% IPP + 6% BP | 81 | 950 | 1 |
| Conventional | 1% IPP + 6% BP | 83 | — | — |
| Conventional | 3% IPP + 5% BP | 82 | — | — |
| Conventional | 5% IPP + 3% BP | 82 | — | — |
| Conventional | 6% IPP + 1% BP | 82 | — | — |

Based on data such as reported above in Table I, two regions within the isopropyl percarbonate-benzoyl peroxide composition system were found which are capable of providing CR-39 ® plastic elements, even in thin laminated form, equaling or exceeding conventional CR-39 ® plastic lens components as to both hardness and scratch resistance. Catalyzed resin formulations consisting essentially, in weight percent, of about 4.5-8.5% isopropyl percarbonate, 0.5-4.5% benzoyl peroxide, at least 6% total of isopropyl percarbonate and benzoyl peroxide, and the remainder diethylene glycol bis(allyl carbonate) combine excellent hardness with superior heavy and light scratch resistance. Compositions within this range but containing not more than about 2% by weight of benzoyl peroxide exhibit the least yellowing and most uniform tinting characteristics, and are therefore particularly preferred for applications such as sunglasses or welding masks where tinting is commonly employed.

Catalyzed resin formulations consisting essentially, in weight percent, of about 0.5-1.5 isopropyl percarbonate, 5.5-6% benzoyl peroxide, and the remainder diethylene glycol bis(allyl carbonate) exhibit the highest hardness of the products tested, but exhibit a yellowish tint and occasionally, non-uniform tinting characteristics which can be objectionable for certain applications. Also benzoyl peroxide is difficult to mix and maintain in solution with CR-39 ® resin at concentrations in the 5-6% weight range.

Figure 2:
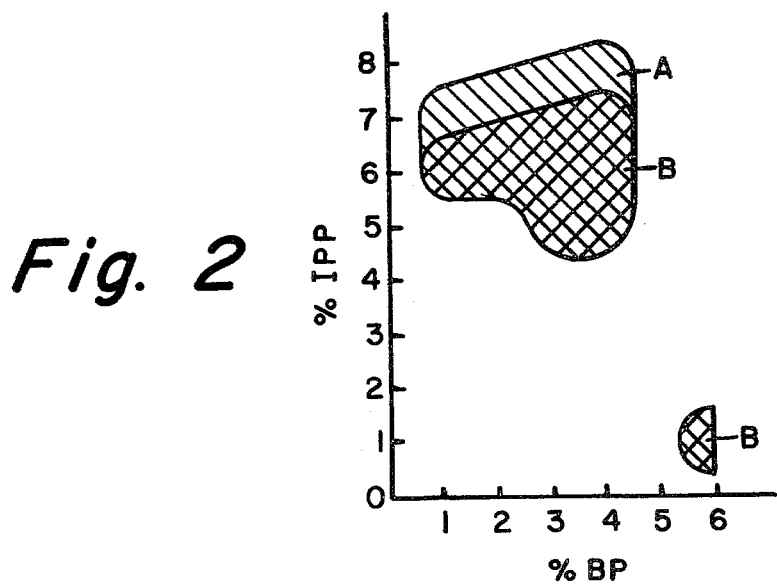
FIG. 2 is a catalyst composition diagram illustrating regions in the isopropyl percarbonate-benzoyl peroxide composition system which are preferred for use in obtaining the cured CR-39 ® plastic lens elements with improved properties.

Even though the use of a mixed catalyst system as hereinabove described requires the handling of an additional polymerization catalyst, and produces lens elements of high hardness which are somewhat more difficult to release from molds than conventional lenses, and require longer tinting intervals, the superior hardness and scratch resistance thereof outweigh these disadvantages for many applications. FIG. 2 of the drawing diagramatically shows those regions within the isopropyl percarbonate-benzoyl peroxide catalyst composition system wherein the hardness and scratch resistance of thin (1 mm) polymerized CR-39 ® plastic lens surface elements bonded to polymeric adhesives will either meet (Region A) or exceed (Region B) the corresponding properties of conventional CR-39 ® plastic lenses. The concentrations of the catalyst components in FIG. 2 are shown in weight percent of the catalyzed CR-39 ® plastic on the horizontal and vertical axes of the diagram.

Figure 3:
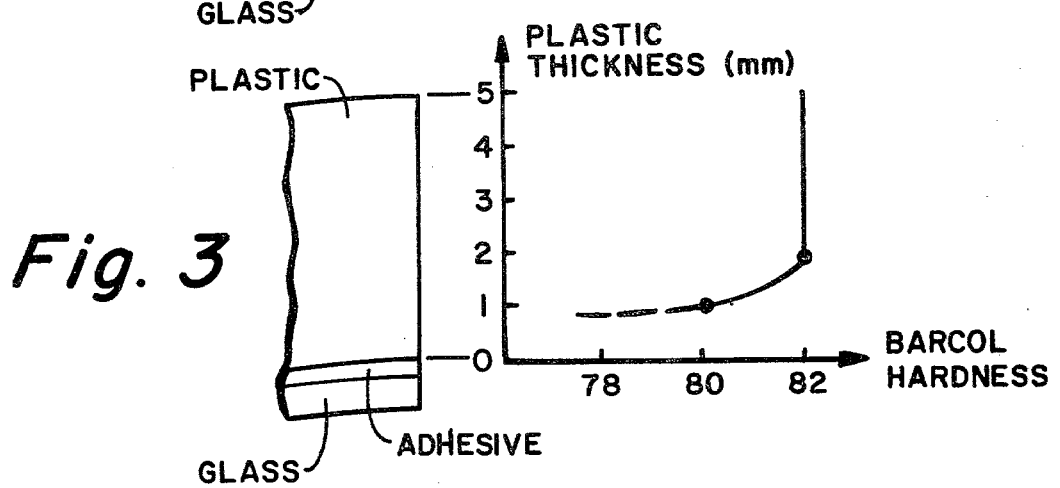
FIG. 3 schematically shows a glass-plastic laminate incorporating a CR-39 ® plastic surface layer according to the invention, in conjunction with a graph plotting Barcol hardness in the manner of FIG. 1.

The hardness characteristics of a surface element of a glass-plastic lens provided in accordance with a preferred embodiment of the invention are illustrated in FIG. 3 of the drawing. The lens is one provided with a CR-39 ® plastic surface element comprising 6% of an isopropyl percarbonate catalyst and 1% of a benzoyl peroxide catalyst by weight, the hardness data being presented in the format of FIG. 1. The data demonstrate that hardness values of at least 80 at a 1 mm. spacing from the bonding layers, ranging up to 82 at the outer surface of the plastic, are obtained.

The combination of benzoyl peroxide with isopropyl percarbonate in proportions within the ranges hereinabove disclosed appears to be unique in enhancing the properties of allyl diglycol carbonate plastics. Alternative polymerization catalysts tried at a 3% by weight concentration in CR-39 ® monomer formulations, including t-butyl peracetate, lauroyl peroxide, 2,5 dimethyl 2,5 dihydroperoxide and cyclohexyl percarbonate, produced cured plastics of substantially lower hardness, in no case exceeding Barcol 70 and in some instances being too soft to measure.

Of course, for applications wherein laminated lenses with good surface hardness and near-standard scratch resistance are acceptable, the data in Table I suggest that increased quantities of isopropyl percarbonate alone will substantially offset the softening influence of the polymeric bonding layer. Thus laminated lenses with CR-39 ® plastic surface elements can be provided which, while not exhibiting the superior combination of hardness and scratch resistance of the doubly catalyzed products, nevertheless are substantially improved with respect to surface hardness over the laminated lenses of the prior art.

We claim:

1. A glass plastic laminated article comprising at least one direct-cast diethylene glycol bis(allyl carbonate) plastic surface element bonded to a glass element by a polymeric bonding layer, wherein the plastic surface element exhibits a Barcol hardness of at least about 77 at all regions spaced 1 mm or greater from the polymeric bonding layer, said plastic surface element having been polymerized from a monomer-catalyst mixture including, as the catalyst, 1–9% of isopropyl percarbonate, 0.5–6% of benzoyl peroxide, and 3.5–13% total of isopropyl percarbonate and benzoyl peroxide by weight.

2. A glass-plastic laminated article in accordance with claim 1 which has the configuration of an ophthalmic lens, comprising a glass core of photochromic microsheet and two plastic surface elements bonded to opposing surfaces of the core.

3. A method for providing a polymerized diethylene glycol bis(allyl carbonate) plastic article or element exhibiting enhanced scratch resistance and hardness which comprises polymerizing a mixture consisting essentially of diethylene glycol bis(allyl carbonate) monomer and a polymerization catalyst consisting essentially of a combination of isopropyl percarbonate and benzoyl peroxide, said mixture including 1–9% of isopropyl percarbonate, 0.5–6% of benzoyl peroxide, 3.5–13% total of isopropyl percarbonate and benzoyl peroxide, and the remainder diethylene glycol bis(allyl carbonate) by weight.

4. A method in accordance with claim 3 wherein the mixture contains 4.5–8.5% isopropyl percarbonate, 0.5–4.5% benzoyl peroxide and at least 6% total of isopropyl percarbonate and benzoyl peroxide by weight.

5. A method in accordance with claim 4 wherein the mixture contains not more than about 2% by weight of benzoyl peroxide.

6. A polymerized diethylene glycol bis(allyl carbonate) plastic article or element provided in accordance with the method of claim 3.

7. A method for providing a polymerized diethylene glycol bis(allyl carbonate) plastic article or element exhibiting enhanced scratch resistance and hardness which comprises polymerizing a mixture consisting essentially of diethylene glycol bis(allyl carbonate) monomer and a polymerization catalyst consisting essentially of a combination of isopropyl percarbonate and benzoyl peroxide, said mixture including 0.5–1.5% isopropyl percarbonate, 5.5–6% of benzoyl peroxide, and the remainder diethylene glycol bis(allyl carbonate) by weight.

* * * * *

UNITED STATES PATENT AND TRADEMARK OFFICE
CERTIFICATE OF CORRECTION

PATENT NO. : 4,311,762

DATED : January 19, 1982

INVENTOR(S) : Anton A. Spycher et al.

It is certified that error appears in the above-identified patent and that said Letters Patent are hereby corrected as shown below:

Column 1, lines 32 through 36, inclusive, delete "hprocedures and correlates well with scratch resistance in cured CR-39® plastic lenses. The hardness values exhibited by commercially available lenses, as measured by a standard Barber-Colman impresser device (Barcol GYZJ 935".

Signed and Sealed this

Twenty-fifth Day of May 1982

[SEAL]

Attest:

GERALD J. MOSSINGHOFF

Attesting Officer

Commissioner of Patents and Trademarks